US007995898B2

(12) United States Patent
Sasaki et al.

(10) Patent No.: US 7,995,898 B2
(45) Date of Patent: Aug. 9, 2011

(54) AUDIO RELAY APPARATUS AND AUDIO RELAY METHOD

(75) Inventors: Takashi Sasaki, Kanagawa (JP); Haruyuki Miura, Kanagawa (JP); Kenichi Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 1114 days.

(21) Appl. No.: 11/410,085

(22) Filed: Apr. 25, 2006

(65) Prior Publication Data

US 2006/0259170 A1 Nov. 16, 2006

(30) Foreign Application Priority Data

Apr. 28, 2005 (JP) ................................. 2005-132298

(51) Int. Cl.

| | |
|---|---|
| ***H04N 5/765*** | (2006.01) |
| ***H04N 5/93*** | (2006.01) |
| ***G11B 27/00*** | (2006.01) |
| *H04N 5/92* | (2006.01) |
| *G06F 15/16* | (2006.01) |
| *G06F 15/173* | (2006.01) |

(52) U.S. Cl. ........ 386/231; 386/232; 386/285; 386/326; 386/338; 386/339; 709/231; 709/203; 709/224; 709/232; 709/233

(58) Field of Classification Search .................... 386/46, 386/52, 54, 95–96, 231, 232, 285, 326, 338, 386/339; 709/231, 203, 224, 232, 233
See application file for complete search history.

(56) References Cited

U.S. PATENT DOCUMENTS

| | | | | |
|---|---|---|---|---|
| 5,900,867 | A * | 5/1999 | Schindler et al. | 715/719 |
| 6,038,368 | A * | 3/2000 | Boetje et al. | 386/278 |
| 6,157,972 | A * | 12/2000 | Newman et al. | 710/100 |
| 6,304,714 | B1 * | 10/2001 | Krause et al. | 386/235 |
| 6,430,620 | B1 * | 8/2002 | Omura et al. | 709/231 |
| 6,701,372 | B2 * | 3/2004 | Yano et al. | 709/232 |
| 6,724,763 | B1 * | 4/2004 | Hiraiwa | 370/401 |
| 6,738,559 | B1 * | 5/2004 | Yoo et al. | 386/46 |
| 6,785,230 | B1 * | 8/2004 | Ogata et al. | 370/230 |
| 2002/0061025 | A1 * | 5/2002 | Masunaga et al. | 370/402 |
| 2002/0188747 | A1 * | 12/2002 | Takeuchi et al. | 709/232 |
| 2003/0037158 | A1 * | 2/2003 | Yano et al. | 709/232 |
| 2003/0163521 | A1 * | 8/2003 | Hoshi | 709/203 |
| 2004/0117835 | A1 * | 6/2004 | Lorkovic | 725/81 |
| 2006/0168310 | A1 * | 7/2006 | Koyanagi et al. | 709/233 |
| 2006/0239563 | A1 * | 10/2006 | Chebil et al. | 382/232 |
| 2008/0005310 | A1 * | 1/2008 | Xu et al. | 709/224 |
| 2008/0222301 | A1 * | 9/2008 | Takeuchi et al. | 709/231 |

FOREIGN PATENT DOCUMENTS

| | | |
|---|---|---|
| JP | 2004-357029 | 12/2004 |

* cited by examiner

*Primary Examiner* — Thai Tran
*Assistant Examiner* — Daquan Zhao
(74) *Attorney, Agent, or Firm* — Finnegan, Henderson, Farabow, Garrett & Dunner, L.L.P.

(57) ABSTRACT

An audio relay apparatus and an audio relay method can relay audio data without being restricted by the reception capacity for receiving audio signals of a downstream audio output apparatus. An AV amp according to the present invention converts the format of the DVD audio data it receives from a DVD player, which is an upstream audio output apparatus, so as to make it match the audio reception capacity of a TV, which is a downstream audio output apparatus and transmits the obtained transformed audio data to the TV. Thus, it can transmit audio signals from the DVD player to the TV regardless of the audio reception capacity of the TV.

7 Claims, 9 Drawing Sheets

AUDIO RELAY APPARATUS AND AUDIO RELAY METHOD

CROSS REFERENCES TO RELATED APPLICATIONS

The present invention contains subject matter related to Japanese Patent Application JP2005-132298 filed in the Japanese Patent Office on Apr. 28, 2005, the entire contents of which being incorporated herein by reference.

BACKGROUND OF THE INVENTION

1. Field of the Invention

This invention relates to an audio relay apparatus and an audio relay method, and is preferably applied to an Audiovisual (AV) system that make it possible to relay a Digital Versatile Disc (DVD) audio data supplied from the DVD player to a television receiving set that is not compatible with any High Definition Multimedia Interface (HDMI), for example.

2. Description of the Related Art

In recent years, the HDMI standards have been stipulated for the purpose of transmitting digital video signals and digital audio signals by way of a single cable and signal selection apparatus have been proposed to make it possible to effectively select any of a plurality of signals input from a plurality of connected equipments by way of an HDMI (see, for example, Jpn. Pat. Appln. Laid-Open Publication No. 2004-357029).

Besides, in the field of AV systems, it has been made possible in recent years to provide high quality sounds of movie contents output from a home use DVD player to a home theater appliance by way of an HDMI cable conforming to the HDMI Standard.

More specifically, with such an AV system, DVD video data and DVD audio data contained in a set of movie contents are transmitted from a DVD player to the AV amp of a home theater appliance by way of an HDMI cable. The AV amp is connected to a front speaker, a front right speaker, a front left speaker, a rear right speaker a rear left speaker and a low tone output sub-woofer speaker. Then, the high quality sounds based on the DVD audio data supplied from the DVD player are output from the plurality of speakers.

The AV amp is connected to a television receiving set by way of an HDMI cable in order to display the images of the DVD video data. While an increasing number of HDMI-compatible television receiving sets have been marketed, the reception capacity of such television receiving sets for receiving DVD audio data is more often than not low if compared with HDMI-compatible AV amps.

SUMMARY OF THE INVENTION

From the viewpoint of the sounds out of the images and the sounds contained in a set of movie contents and AV systems of the type under consideration, if the reception capacity of an HDMI-compatible AV amp, to which the DVD audio data contained in a set of movie contents reproduced from an HDMI-compatible DVD player are transmitted, corresponds to Dolby Audio Code number3 (AC3)-5.1ch and Pulse Code Modulation (PCM)-6ch, for example, the DVD player is adapted to read the reception capacity from the AV amp at the time when it is connected to the HDMI cable so that the DVD player transmits DVD audio data within the reception capacity, for example DVD audio data good for Dolby AC3-5.1ch, to the AV amp.

In short, if the audio data transmission capacity of a DVD player is equal to the reception capacity of the AV amp, the DVD player can transmit the DVD audio data it has to the AV amp so as to realize the highest sound quality it can provide. On the other hand, if the audio data transmission capacity of a DVD player exceeds the reception capacity of the AV amp, the DVD player cannot help transmitting the DVD audio data so as to realize a level of sound quality that matches the reception capacity of the AV amp.

On the other hand, when the AV amp relays and transmits the DVD audio data it receives from the DVD player to a television receiving set, it reads the reception capacity of the television receiving set, to which it transmits the DVD audio data, just like the DVD player does and transmits the DVD audio data so as to realize a level of sound quality that matches the reception capacity of the television receiving set.

However, in reality, if the reception capacity of an HDMI-compatible AV amp and that of an HDMI-compatible television receiving set are compared with each other, the former is generally larger than the latter.

Therefore, there can arise situations where the AV amp is required either to transform the DVD audio data it receives from the DVD player into audio data that matches the reception capacity of the television receiving set or not to transmit the DVD audio data to the television receiving set at all.

Thus, in an AV system where an AV amp is connected between a DVD player and a television receiving set and it is not possible to transmit the DVD audio data from the DVD player to the television receiving set by way of the AV amp, a user cannot help selecting the sound outputs of the plurality of speakers connected to the AV amp because no sound is output from the speakers of the television receiving set. In short, the user is restricted in terms of selecting the speakers from which the sounds of the DVD audio data are output to a great disadvantage on the part of the AV system.

The present invention has been made in view of the above-identified circumstances, it is desirable to provide an audio relay apparatus and an audio relay method that can relay audio data without being restricted by the reception capacity for receiving audio signals of a downstream audio output apparatus.

In order to solve the above problems, when receiving audio signals from an upstream audio output apparatus and relaying and outputting them to a downstream audio output apparatus, an apparatus and a method according to the present invention are adapted to receive audio signals from the upstream audio output apparatus, read and recognize the audio signal reception capacity of the downstream audio output apparatus from a memory section of the downstream audio output apparatus, convert the format of the audio signals to make it match the audio signal reception capacity of the downstream audio output apparatus, and transmit the obtained transformed audio signals to the downstream audio output apparatus.

With this arrangement, it is possible to read and recognize the audio signal reception capacity of the downstream audio output apparatus, transform the format of the audio signals and transmit the obtained transformed audio signals to the downstream audio output apparatus. Thus, it is possible to transmit the audio signals from the upstream audio output apparatus to the downstream audio output apparatus regardless of the audio signal reception capacity of the downstream audio output apparatus.

Further, in the present invention, when receiving audio signals from an upstream audio output apparatus and relaying and outputting them to a downstream audio output apparatus, the apparatus and the method according to the present invention are adapted to receive audio signals from the upstream audio output apparatus, read and recognize the audio signal reception capacity of the downstream audio output apparatus from a memory section of the downstream audio output apparatus, rewrite the contents stored in the memory section of the audio relay apparatus so as to store the common capacity of the audio signal reception capacity of the audio relay apparatus itself as stored in the relay side storage section of the audio relay apparatus and the audio signal reception capacity of the downstream audio output apparatus, and transmit the audio signals received from the upstream audio output apparatus straight to the downstream audio output apparatus so as to correspond to the common capacity.

With this arrangement, it is possible to read and recognize the audio signal reception capacity of the downstream audio output apparatus and rewrite the contents stored in the relay side storage section of the audio relay apparatus. Thus, it is possible to transmit the audio signals transmitted form the upstream audio output apparatus straight to the downstream audio output apparatus so as to correspond to the common capacity.

Thus, according to the present invention, it is possible to read and recognize the audio signal reception capacity of the downstream audio output apparatus, transform the format of the audio signals and transmit the obtained transformed audio signals to the downstream audio output apparatus. Thus, it is possible to transmit the audio signals from the upstream audio output apparatus to the downstream audio output apparatus regardless of the audio signal reception capacity of the downstream audio output apparatus. Therefore, it is possible to realize an audio relay apparatus and an audio relay method that can relay and transmit audio signals without being restricted by the audio signal reception capacity of the downstream audio output apparatus.

Thus, according to the present invention, it is possible to read and recognize the audio signal reception capacity of the downstream audio output apparatus and rewrite the contents stored in the relay side storage section of the audio relay apparatus. Thus, it is possible to transmit the audio signals transmitted form the upstream audio output apparatus straight to the downstream audio output apparatus so as to correspond to the common capacity. Therefore, it is possible to realize an audio relay apparatus and an audio relay method that can relay and transmit audio signals without being restricted by the audio signal reception capacity of the downstream audio output apparatus.

The nature, principle and utility of the invention will become more apparent from the following detailed description when read in conjunction with the accompanying drawings in which like parts are designate by like reference numerals or characters.

DETAILED DESCRIPTION OF THE PREFERRED EMBODIMENTS

Now, preferred embodiments of the present invention will be described in greater detail by referring to the accompanying drawings.

(1) Summary of AV System

Figure 1:
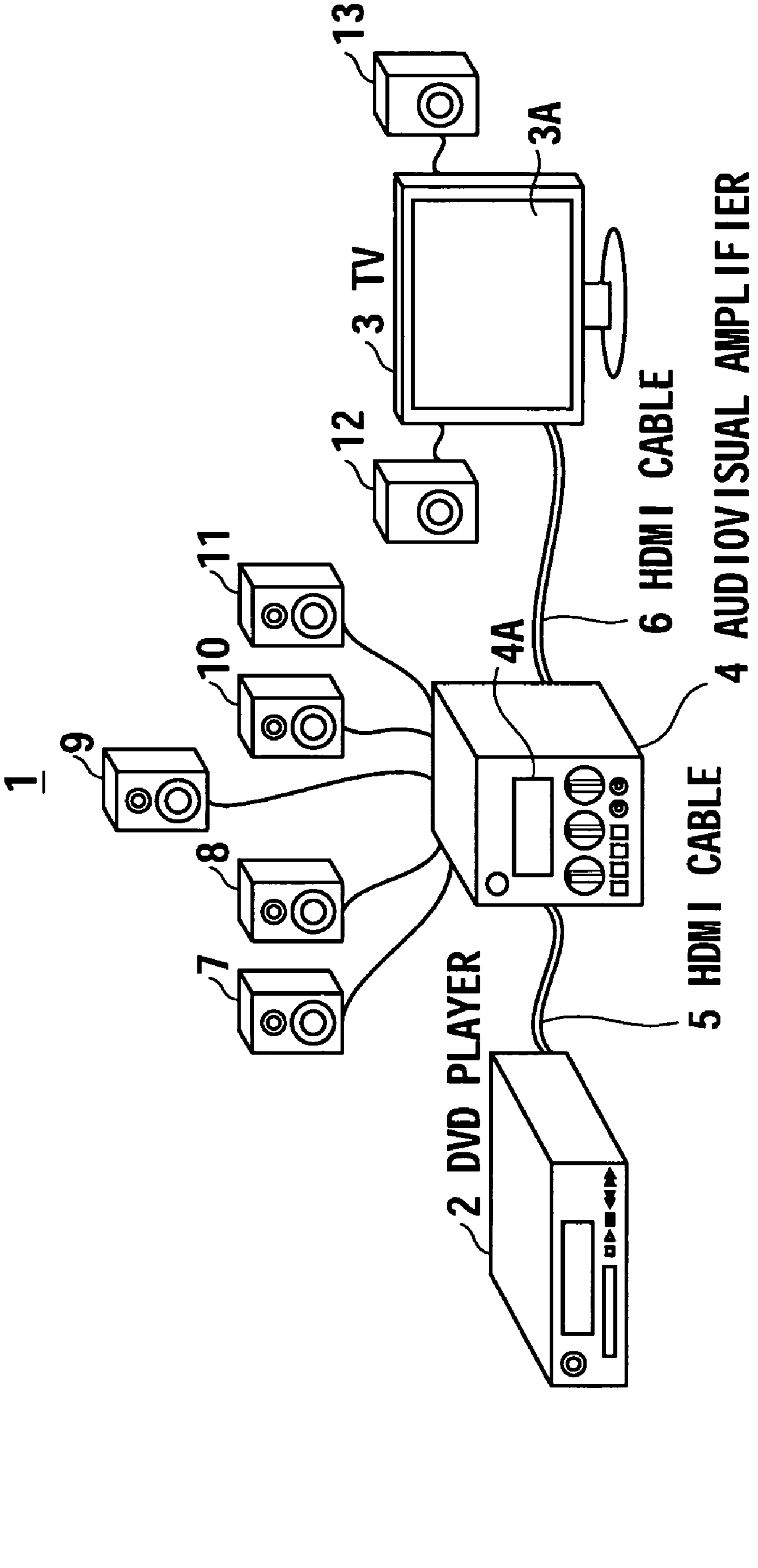
FIG. 1 is a schematic perspective view of an AV system to which the present invention is applicable, illustrating the overall configuration thereof.

Referring to FIG. 1, 1 generally denotes an AV system to which a first embodiment of the invention is applicable. The AV system includes a DVD player 2, a television receiving set (to be referred to simply as TV hereinafter) 3 and an AV amp 4 connected between the DVD player 2 and the TV 3 as relay apparatus.

The AV amp 4 is connected to a plurality of speakers 7 through 11 for forming a 5.1ch surround system, whereas the TV 3 that includes a monitor section 3A is connected to speakers 12 and 13 to realize a stereo sound system for the TV 3.

The DVD player 2 and the AV amp 4 are connected to each other by way of an HDMI cable 5, while the AV amp 4 and the TV 3 are connected to each other by way of an HDMI cable 6. Thus, the DVD video data and the DVD audio data output from the DVD player 2 are sequentially transmitted to the AV amp 4 and then to the TV 3 by the HDMI cables 5, 6.

A High-Definition Multimedia Interface (HDMI) is a digital video/audio input/output interface to be used for an AV appliance. It is realized on the basis of and by developing a Digital Visual Interface (DVI) designed to connect a personal computer and a display. A high degree of compatibility is set between the HDMI and the DVI.

While a DVI is compatible with RGB signals because it is specifically designed so as to be used for a computer, an HDMI is not compatible with RGB signals but can be used with YUV signals that are being popularly used for AV appliances to transmit video signals. An HDMI is characterized most in that, while a DVI can transmit only video signals, an HDMI can transmit “digital video signals”, “digital audio signals” and “digital control signals” by way of a single cable.

Additionally, an HDMI can transmit control signals in opposite directions so that it can be used to control a plurality of AV appliances by way of a single remote controller when a relay apparatus is used to connect the AV appliances. Additionally, an HDMI is compatible not only with Standard Definition Television (SDTV) but also with High Definition Television (HDTV) of digital transmission.

(2) First Embodiment (2-1) Audio Transmission Technique Using Hardware

Figure 2:
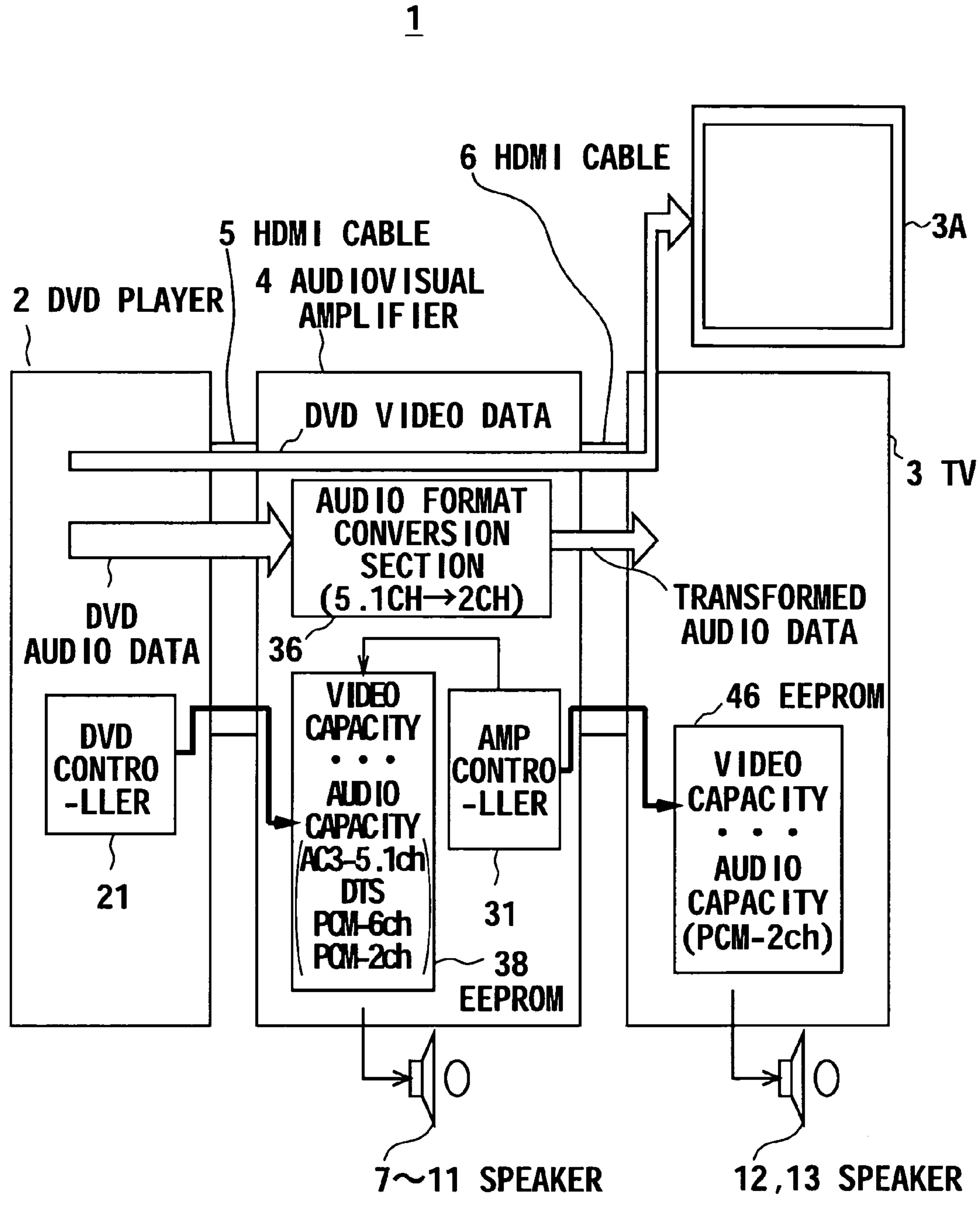
FIG. 2 is a schematic block diagram of a first embodiment of the present invention and a schematic illustration of the audio transmission technique for transmitting audio signals to a TV set by means of hardware that is employed by the first embodiment.

In an AV system 1 as illustrated in FIG. 2, the DVD controller 21 of the DVD player 2 reads the reception capacity of the AV amp 4 (in this instance, for Dolby AC3-5.1ch, Digital Theater System (DTS), Pulse Code Modulation (PCM)-6ch and PCM-2ch) written in the EEPROM 38 of the downstream AV amp 4 connected to the DVD player 2 by way of an HDMI cable 5 and recognizes it.

The contents recorded on the DVD to be replayed include DVD video data and DVD audio data and, if the DVD audio data match multi-channel Dolby AC3-5.1ch and the reception capacity of the AV amp 4 also matches "Dolby AC3-5.1ch", the DVD controller 21 of the DVD player 2 transmits the DVD audio data of Dolby AC3-5.1ch to the AV amp 4 by way of the HDMI cable 5.

Thus, the AV amp 4 receives the DVD audio data of Dolby AC3-5.1ch supplied from the DVD player 2 and outputs the sounds based on the DVD audio data to the plurality of speakers 7 through 11 connected to the AV amp 4 to reproduce the sounds of 5.1ch surround.

It should be noted that, if the reception capacity of the AV amp 4 matches only PCM-2ch, the DVD controller 21 of the DVD player 2 has to transform the DVD audio data of Dolby AC3-5.1ch into audio data of PCM-2ch by format conversion.

Additionally, upon receiving the DVD audio data of Dolby AC3-5.1ch from the DVD player 2, the amp controller 31 of the AV amp 4 reads and recognizes the reception capacity of the TV 3 (only for PCM-2ch in this instance) written in the Electrically Erasable Programmable Read-only Memory (EEPROM) 46 connected to it by way of the HDMI cable 6 and arranged downstream relative to it.

Since the audio data supplied from the DVD player 2 are DVD audio data of Dolby AC3-5.1ch and the reception capacity of the downstream TV 3 is only for PCM-2ch, the amp controller 31 of the AV amp 4 cannot directly receive the DVD audio data of Dolby AC3-5.1ch.

Thus, the amp controller 31 of the AV amp 4 transforms the DVD audio data of Dolby AC3-5.1ch into audio data that match PCM-2ch, for which the TV 3 has reception capacity, by means of the audio format conversion section 36 of the AV amp 4 and transmits the audio data obtained by transformation for PCM-2ch to the TV 3 by way of the HDMI cable 6.

As a result, the TV 3 can output the sounds of the audio data that are supplied from the AV amp 4 and obtained by transformation for PCM-2ch by way of the speakers 12 and 13.

(2-2) Circuit Configuration of AV System to Which the First Embodiment is Applicable Now, the configuration of the circuit for realizing the audio transmission technique for transmitting audio data to the TV by means of hardware of the first embodiment will be described below by referring to FIG. 3.

The DVD player 2 of the AV system 1 controls all the operations thereof by means of the DVD controller 21 including a Central Processing Unit (CPU). The DVD controller 21 reads the DVD video data DV1 and the DVD audio data DA1 of the contents recorded on the DVD 22 by means of an optical pickup 23 and sends them out to a backend section 24.

The backend section 24 executes predetermined processes including a decoding process and an error correction process on the DVD video data DV1 and the DVD audio data DA1 and sends out the DVD video data DV1 and the DVD audio data DA1 to audio format conversion section 25.

Meanwhile, when the AV amp 4 is connected to it by way of the HDMI cable 5, the DVD controller 21 of the DVD player 2 reads the reception capacity of the AV amp 4 that is written in the EEPROM 38 of the AV amp 4 (in this instance, for Dolby AC3-5.1ch, DTS, PCM-6ch and PCM-2ch) by way of the Inter-Integrated Circuit (I2C) bus of the HDMI cable 5 to check the limit of the audio reception capacity of the AV amp 4.

The reception capacity as used herein refers to the audio format by which the AV amp 4 can receive DVD audio data DA1 from the DVD player 2 and transmit the DVD audio data DA1 to the TV 3.

Thus, if the audio format of the DVD audio data DA1 is for Dolby AC3-5.1ch and the reception capacity of the AV amp 4 matches Dolby AC3-5.1ch, the audio format conversion section 25 can send out the DVD audio data DA1 for Dolby AC3-5.1ch to HDMI transmission section 26 as DVD audio data DA2 without converting the format for the DVD audio data DA1.

If, on the other hand, the audio format of the DVD audio data DA1 is for Dolby AC3-5.1ch and the reception capacity of the AV amp 4 does not match Dolby AC3-5.1ch but matches only PCM-2ch, the audio format conversion section 25 converts the format of the DVD audio data DA1 from that of Dolby AC3-5.1ch to that of PCM-2ch under the control of the DVD controller 21 and sends out the DVD audio data DA2 for PCM-2ch obtained as a result of the format conversion to the HDMI transmission section 26.

The DVD 22 may store DVD audio data DA1 that match the format of Dolby AC3-5.1ch, that of DTS, that of PCM-6ch and that of PCM-2ch. If such is the case, the DVD controller 21 sends out the DVD audio data of the audio format that matches the reception capacity of the AV amp 4 to the HDMI transmission section 26 without executing any audio format conversion process by the audio format conversion section 25.

Note that the audio format conversion section 25 also converts the format of the DVD video data DV1 into the format that matches the reception capacity of the AV amp 4 under the control of the DVD controller 21 and sends them to the HDMI transmission section 26 as DVD video data DV2.

The HDMI transmission section 26 converts the format of the DVD video data DV2 and that of the DVD audio data DA2 into those in which it can transmit the data by way of the HDMI cable 5 and executes a predetermined encryption process and other processes on the data. Then, it transmits them to the AV amp 4 by way of input/output terminal 27, the HDMI cable 5 and input/output terminal 32 that conform to the HDMI Standard.

The AV amp 4 controls all the operations thereof by means of the amp controller 31 including a CPU and transmits the DVD video data DV2 and the DVD audio data DA2 input to it byway of the input/output terminal 32 to HDMI reception section 33.

The HDMI reception section 33 turns the format of the DVD video data DV2 and that of the DVD audio data DA2 back into those by which it can process the data by means of the DSP 34 and so on and sends out the DVD video data DV3 and the DVD audio data DA3 obtained as a result to respectively to a video delay memory 39 and to the DSP 34 and the audio format conversion section 36.

The DSP 34 executes digital signal processes including a digital/analog conversion process on the DVD audio data DA3 and boosts the obtained DVD audio signal SA4 to a predetermined level by means of an amplifier 35. Subsequently, the DSP 34 outputs the sounds of the DVD audio signal SA4 from the speakers 7 through 11.

Meanwhile, when the AV amp 4 is connected to the TV 3 by way of the HDMI cable 6, the amp controller 31 of the AV amp 4 reads the reception capacity (in this instance, only for PCM-2ch) written in the EEPROM 46 of the TV 3 by way of the I2C bus of the HDMI cable 6 to check the limit of the audio reception capacity of the TV 3.

While the DVD audio data DA3 supplied from the DVD player 2 are for Dolby AC3-5.1ch, the reception capacity of the TV 3 to which the DVD audio data DA3 are transmitted is only for PCM-2ch. Therefore, the amp controller 31 of the AV amp 4 converts the format of the DVD audio data DA3 for Dolby AC3-5.1ch into the format for PCM-2ch by means of the audio format conversion section 36 and sends out the audio data TD1 obtained as a result of the conversion to the HDMI transmission section 37.

The video delay memory 39 holds the DVD video data DV3 for the duration of time during which the audio format conversion section 36 converts the format of the DVD audio data DA3 for Dolby AC3-5.1ch into the format for PCM-2ch and thereafter sends out the DVD video data DV3 to the HDMI transmission section 37. As a result, the AV amp 4 can reliably synchronize the DVD video data DV3 and the transformed audio data TD1 and prevent advance the display section 3A of the TV 3 from producing the problem of out of lip synchronization.

Then, the HDMI transmission section 37 converts the format of the DVD video data DV3 and that of the transformed audio data TD1 for PCM-6ch into the those that are compatible with the HDMI cable 6 and then transmits the data to the TV 3 by way of input/output terminal 40 that conforms to the HDMI Standards, the HDMI cable 6 and the input/output terminal 42.

The TV 3 controls all the operation thereof by means of the TV controller 41, which includes a CPU, and transmits the DVD video data DV3 and the transformed audio data TD1 it receives by way of the input/output terminal 42 to the HDMI reception section 43.

The HDMI reception section 43 turns the format of the DVD video data DV3 and that of the transformed audio data TD1 back into those by which it can process the data by means of the video DSP 47 and the audio DSP 44 and so on and sends out the DVD video data DV4 and the transformed audio data TD2 obtained as a result respectively to the video DSP 47 and to the audio DSP 44.

The video DSP 47 executes digital signal processes including a digital/analog transformation process on the DVD video data DV4 and outputs the DVD video signal SV5 obtained as a result to the monitor section 3A so as to let the monitor section 3A display the images that corresponds to the DVD video signal SV5.

The audio DSP 44 executes digital signal processes including a digital/analog transformation process on the transformed audio data TD2, amplifies the transformed audio signal TA3 obtained as a result to a predetermined level and then outputs the sounds that correspond to the transformed audio signal TA3 by way of the speakers 12 and 13.

With the above-described arrangement, the images that correspond to the DVD video data DV1 reproduced by the DVD player 2 are displayed on the monitor 3A while the sounds that correspond to the DVD audio data DA1 also reproduced by the DVD player 2 are output as PCM-2ch stereo sounds, which match the reception capacity of the TV 3, from the speakers 12 and 13.

(2-3) Operations and Advantages of the First Embodiment

The DVD player 2, the AV amp 4 and the TV 3 of the AV system 1 realized by applying the first embodiment may be defined respectively as source machine, a repeater and a sink machine. As the AV amp 4 receives the DVD audio data DA2 for Dolby AC3-5.1ch from the upstream DVD player 2 as the reception capacity of the AV amp 4 can accommodate the data, it can output the sounds that correspond to the DVD audio data DA2 as high quality sounds of 5.1ch surround from the plurality of speakers 7 through 11 by way of the DSP 34 and the amp 35 (FIG. 2).

Additionally, when the AV amp 4 transmits the DVD audio data DA2 for Dolby AC3-5.1ch it receives from the DVD player 2 to the downstream TV 3, it converts the format of the DVD audio data DA3 for Dolby AC3-5.1ch into the format of transformed audio data TD1 for PCM-2ch by means of the audio format conversion section 36, which is hardware, and transmits the transformed audio data TD1 to the TV 3 if the reception capacity of the AV amp 4 does not agree with that of the TV 3.

Therefore, the AV system 1 can provide high quality sounds of 5.1ch surround by way of the plurality of speakers 7 through 11 of the AV amp 4 and stereo sounds for PCM-2ch by way of the speakers 12 and 13 of the TV 3.

Thus, with the AV system 1, it is possible to suspend the emission of sounds by means of the speakers 12 and 13 of the TV3 when the AV amp 4 is outputting high quality sounds of 5.1ch surround by means of the plurality of speakers 7 through 11 or suspend the emission of sounds by means of the speakers 7 through 11 of the AV amp 4 when the TV 3 is outputting stereo sounds by means of the speakers 12 and 13 of the TV3.

With the above-described arrangement, the AV amp 4 of the first embodiment can convert the format of the DVD audio data DA2 it receives from the DVD player 2 into the format that matches the reception capacity of the downstream TV 3 by means of the audio format conversion section 36. Thus, the AV amp 4 can reliably transmit the DVD audio data DA2 supplied from the DVD player 2 to the TV 3 as transformed DVD audio data TD1 that match the reception capacity of the TV 3 and output the stereo sounds that correspond to the transformed audio data TD1 by way of the speakers 12 and 13 of the TV 3.

(3) Second Embodiment (3-1) Technique for Audio Transmission to TV by Means of Software The AV system 1 realized by applying the second embodiment of the present invention can select one of the two modes of operation including an interrupt mode and a through mode when the AV amp 4 relays signals from the DVD 2 to the TV 3.

In reality, the AV amp 4 has a display section 4A (FIG. 1) that is a liquid crystal display on the surface thereof and prompts the user to select the interrupt mode or the through mode from the menu displayed on the display screen of the display section 4A.

(3-2) Interrupt Mode

Figure 4:
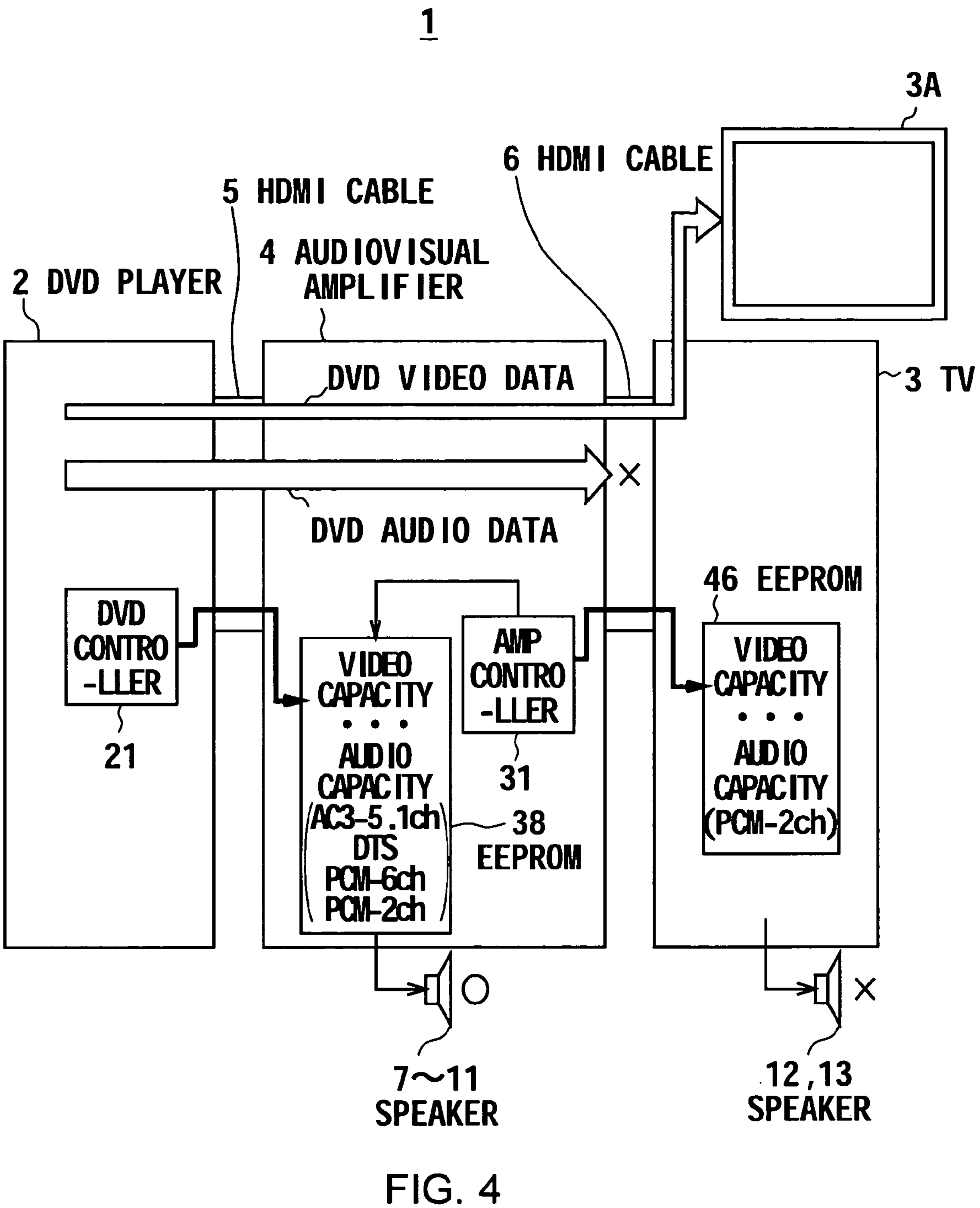
FIG. 4 is a schematic block diagram of a second embodiment of the present invention and a schematic illustration of the audio transmission technique (interrupt mode) for transmitting audio signals to a TV set by means of software that is employed by the second embodiment.

In FIG. 4, the components that are the same as or similar to those of the FIG. 2 are denoted respectively by the same reference symbols. Referring to FIG. 4, when the user selects the interrupt mode by means of the display section 4A of the AV amp 4, the DVD controller 21 of the DVD player 2 of the AV system 1 reads and recognizes the reception capacity of the AV amp 4 written in the EEPROM 38 of the AV amp 4 that is connected to it by way of the HDMI cable 5 (in this instance, for Dolby AC3-5.1ch, DTS, PCM-6ch and PCM-2ch).

The contents recorded on the DVD to be replayed include DVD video data and DVD audio data and, if the DVD audio data match multi-channel Dolby AC3-5.1ch and the reception capacity of the AV amp 4 also matches "Dolby AC3-5.1ch", the DVD controller 21 of the DVD player 2 transmits the DVD audio data of Dolby AC3-5.1ch to the AV amp 4 by way of the HDMI cable 5.

Thus, the AV amp 4 receives the DVD audio data of Dolby AC3-5.1ch supplied from the DVD player 2 and outputs the sounds based on the DVD audio data to the plurality of speakers 7 through 11 to reproduce the sounds of 5.1ch surround.

It should be noted that, if the reception capacity of the TV 3 matches only PCM-2ch, the DVD controller 21 of the DVD player 2 cannot transmit the DVD audio data of Dolby AC3-5.1ch to the downstream TV 3 by way of the AV amp 4.

In other words, while the AV system 1 can transmit the DVD video data supplied from the DVD player 2 to the TV 3 by way of the HDMI cable 5, the AV amp 4 and the HDMI cable 6 and have the monitor section 3A display the images corresponding to the DVD video data and also the DVD audio data for Dolby AC3-5.1ch to the AV amp 4, it cannot transmit the DVD audio data from the AV amp 4 to the TV 3. This mode of operation of the AV system 1 is referred to as interrupt mode, where the user can only have the AV amp 4 output the audio data for sounds of 5.1ch surround.

(3-3) Through Mode

Figure 5:
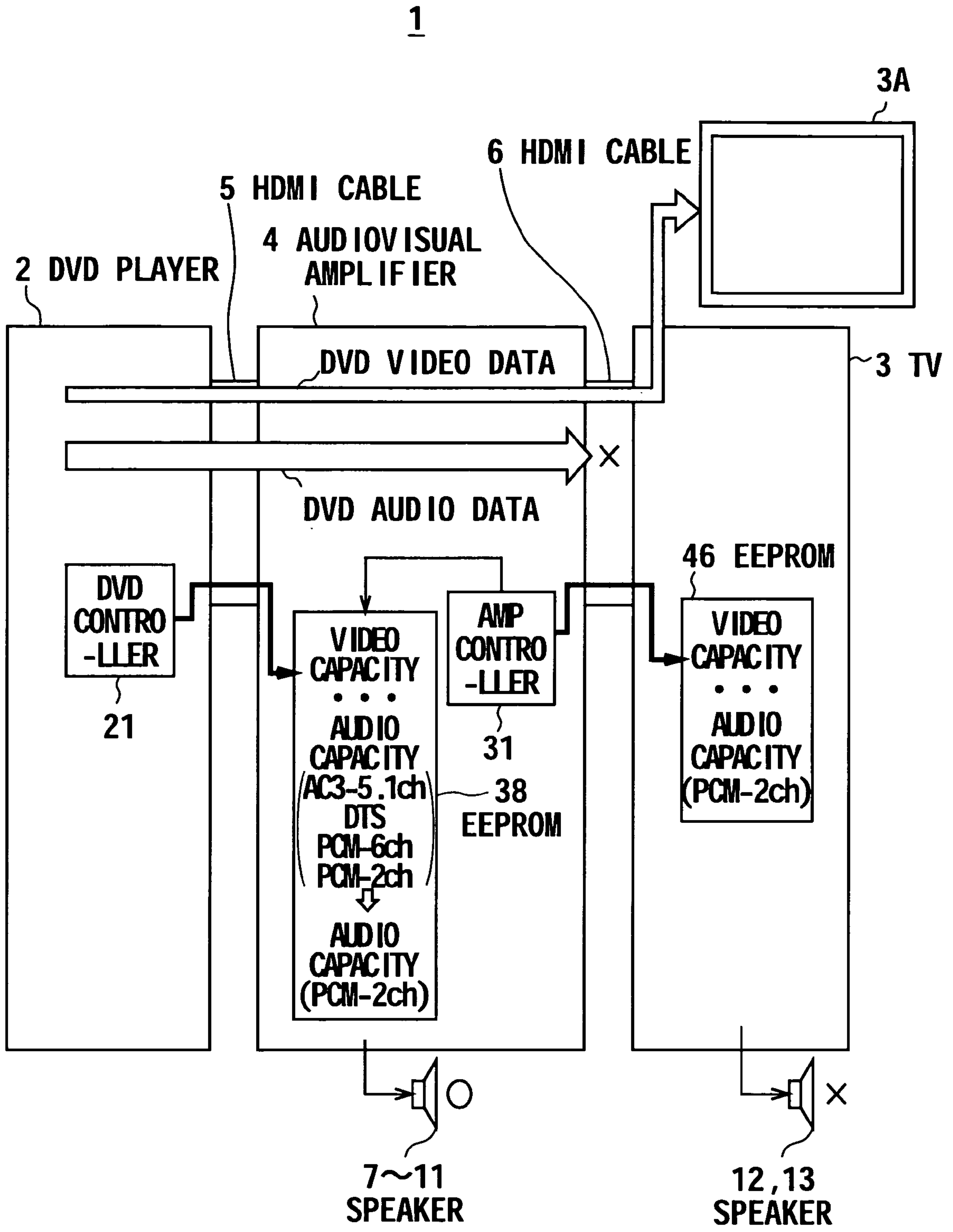
FIG. 5 is a schematic block diagram of the second embodiment of the present invention and a schematic illustration of the audio transmission technique (through mode) for transmitting audio signals to a TV set by means of software that is employed by the second embodiment.

In FIG. 5, the components that are the same as or similar to those of the FIG. 4 are denoted respectively by the same reference symbols. Referring to FIG. 5, when the user selects the through mode by means of the display section 4A of the AV amp 4, the amp controller 31 of the AV amp 4 reads and recognizes the reception capacity of the AV amp 4 written in the EEPROM 46 of the TV 3 by way of the HDMI cable 6 (in this instance, only for PCM-2ch).

Then, the amp controller 31 of the AV amp 4 compares the reception capacity (for Dolby AC3-5.1ch, DTS, PCM-6ch and PCM-2ch) written in its own EEPROM 38 and the reception capacity (for PCM-2ch) of the TV 3 and understands that the common capacity (to be referred to as common reception capacity hereinafter) is only for "PCM-2ch".

Figure 6:
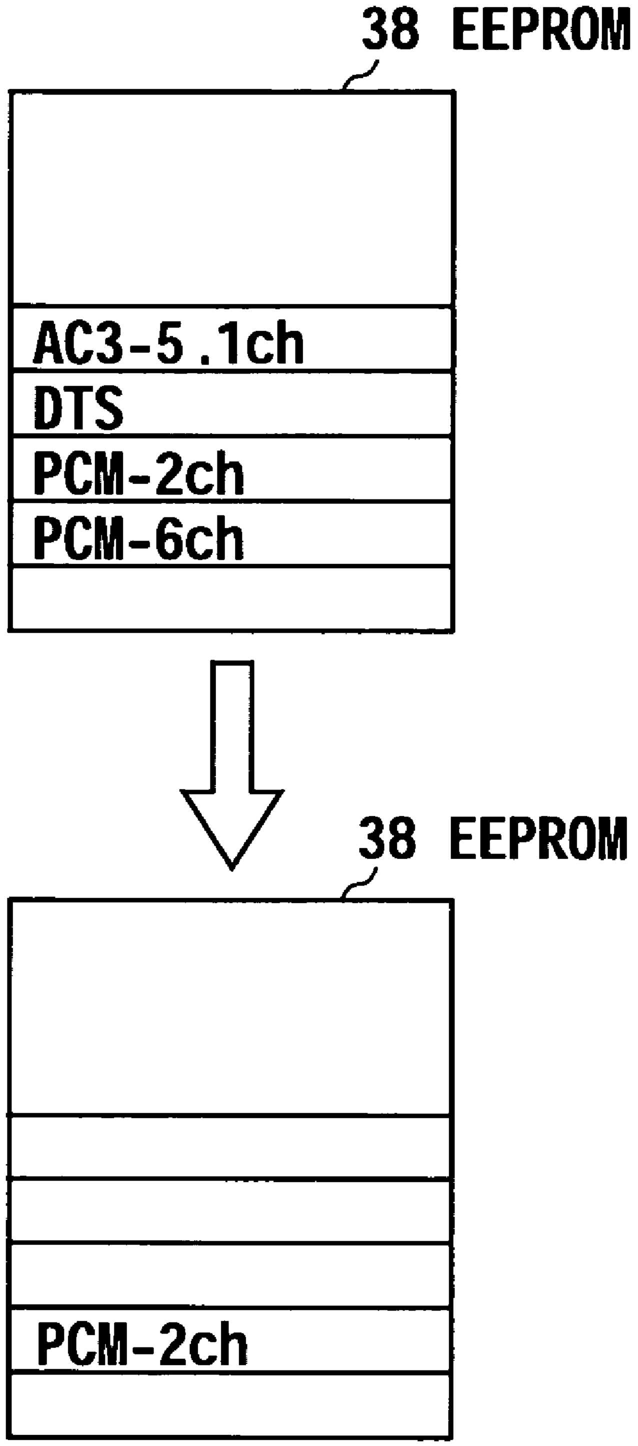
FIG. 6 is a schematic illustration of an operation of rewriting an EEPROM.

Then, as shown in FIG. 6, the amp controller 31 of the AV amp 4 is adapted to rewrite the contents of the EEPROM 38 so as to leave only "PCM-2ch" that is common to its own reception capacity for "Dolby AC3-5.1ch, DTS, PCM-6ch and PCM-2ch" written in its own EEPROM 38 and the reception capacity of the TV 3 for "PCM-2ch".

It should be noted that the amp controller 31 of the AV amp 4 stores the reception capacity (for Dolby AC3-5.1ch, DTS, PCM-6ch and PCM-2ch) of the AV amp 4 in the internal Read Only Memory (ROM) as default and is adapted to read the reception capacity from the internal ROM and write the default back to the EEPROM 38 when the through mode is over. Thus, the amp controller 31 of the AV amp 4 can move into the interrupt mode after the through mode.

As the DVD controller 21 of the DVD player 2 reads the common reception capacity (for PCM-2ch) rewritten in the EEPROM 38 of the AV amp 4, it recognizes that the AV amp 4 has only reception capacity for "PCM-2ch".

Thus, the contents recorded on the DVD to be replayed include DVD video data and the DVD audio data and if the DVD audio data match multi-channel Dolby AC3-5.1ch, the DVD controller 21 of the DVD player 2 converts the format of the DVD audio data to that of PCM-2ch and transmits the DVD audio data for PCM-2ch to the AV amp 4 by way of the HDMI cable 5.

Then, the AV amp 4 receives the DVD audio data of PCM-2ch supplied from the DVD player 2 and transmits the DVD audio data of PCM-2ch to straight to the TV 3 by way of the HDMI cable 6. Thus, the DVD audio data of PCM-2ch supplied from the DVD player 2 can be transmitted to the TV 3 in a through state.

Thus, the TV 3 can output the stereo sounds that correspond to the DVD audio data for PCM-2ch it receives from the DVD player 2 by way of the AV amp 4 by means of the speakers 12 and 13.

Note that, since the AV amp 4 receives the DVD audio data for PCM-2ch from the DVD player 2, it cannot realize proper 5.1ch surround if it outputs the sounds corresponding to the DVD audio data by means of the plurality of speakers 7 through 11 but it can at least output stereo sounds corresponding to the DVD audio data for PCM-2ch.

Thus, when the through mode is selected in the AV system 1, it is possible to output stereo sounds for PCM-2ch by means of the speakers 7 through 11 of the AV amp 4 and at the same time the stereo sounds for PCM-2ch by means of the speakers 12 and 13 of the TV 3.

Figure 3:
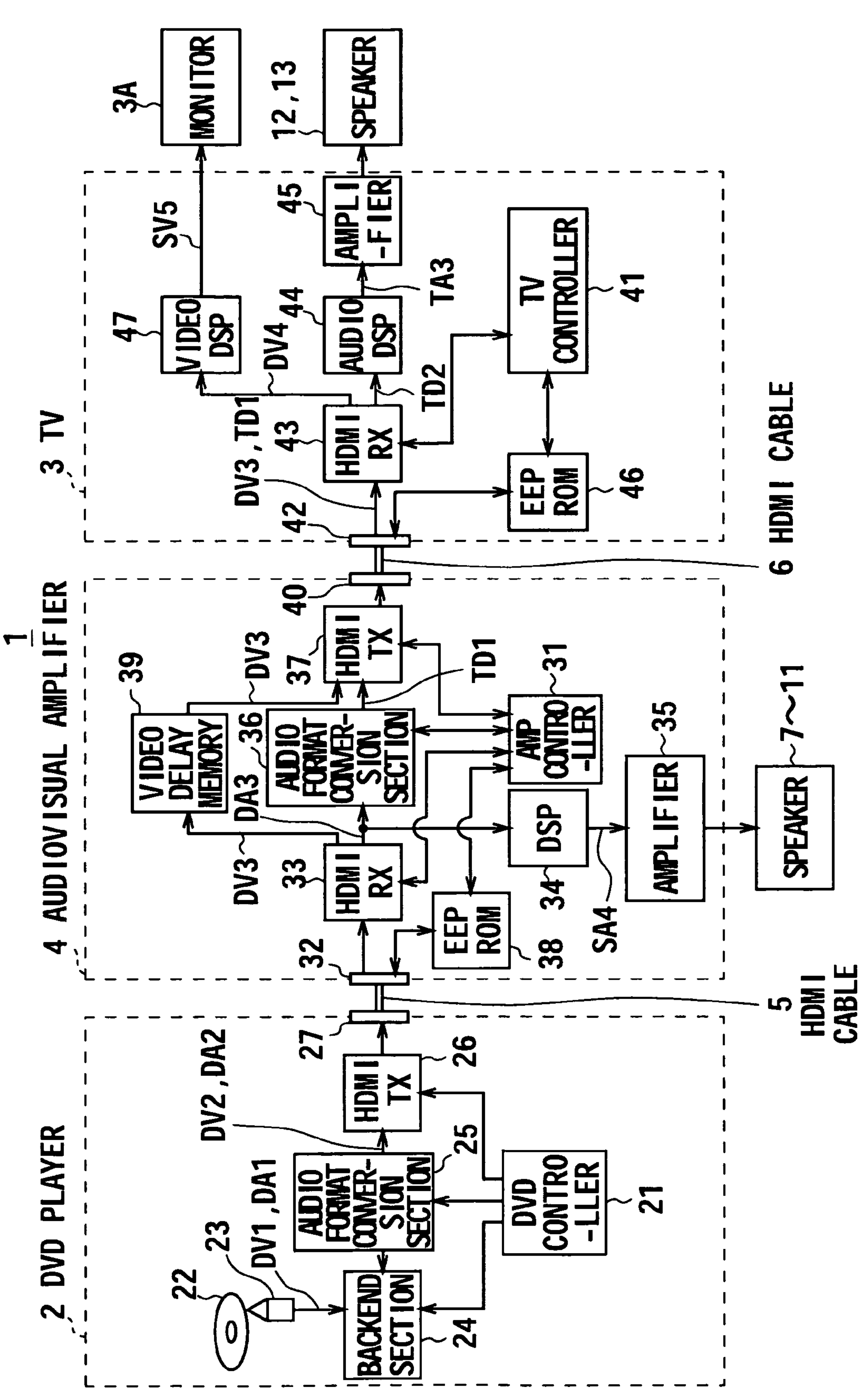
FIG. 3 is a schematic block diagram of the first embodiment of the present invention and a schematic illustration of the circuit configuration of the AV system to which the embodiment is applied.
Figure 7:
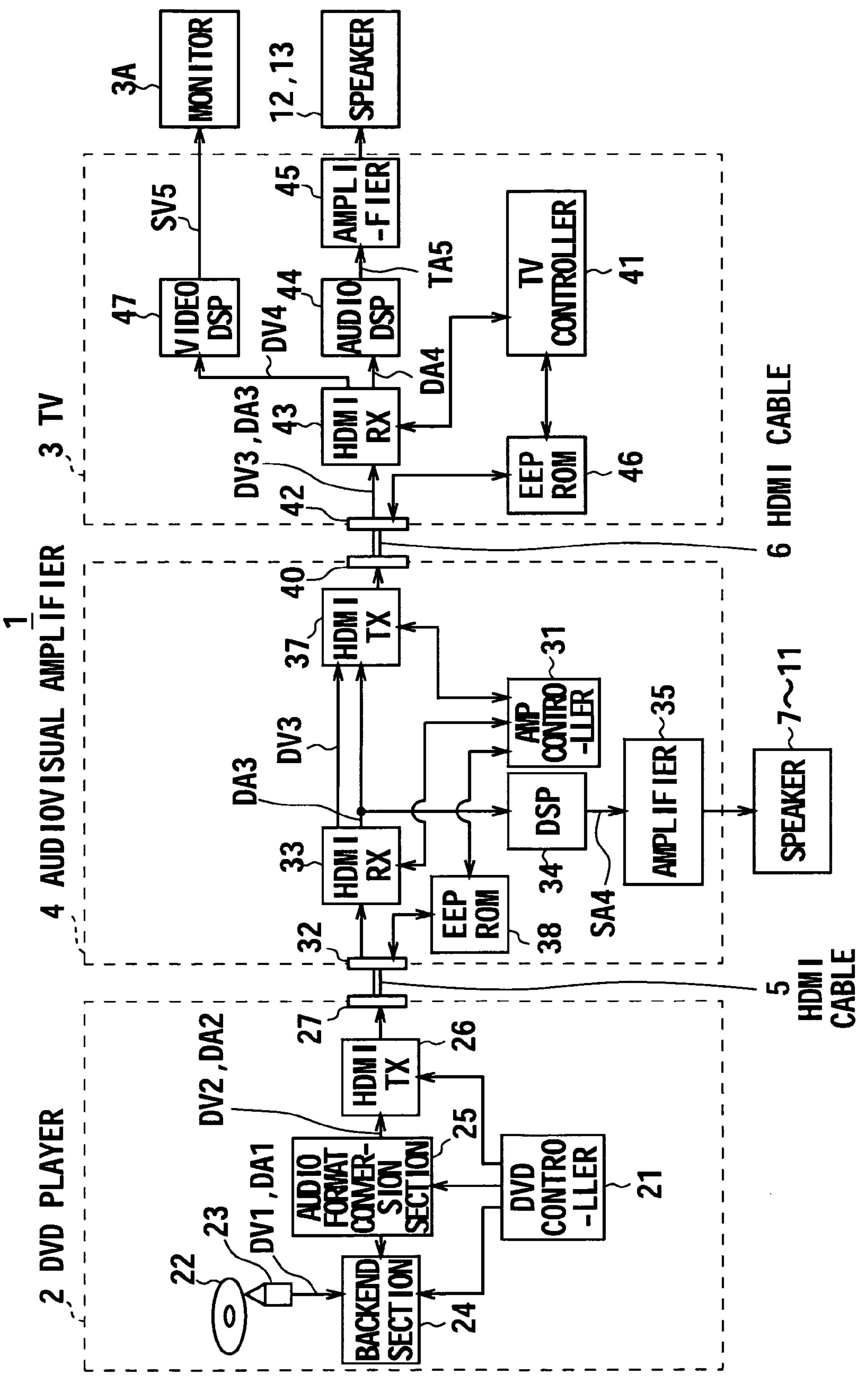
FIG. 7 is a schematic block diagram of the second embodiment of the present invention and a schematic illustration of the circuit configuration of the AV system to which the embodiment is applied.

(3-4) Circuit Configuration of AV System to Which the Second Embodiment is Applicable Now, the configuration of the circuit for realizing the audio transmission technique for transmitting audio data to the TV by means of software of the second embodiment will be described below by referring to FIG. 7, in which the components same as or similar to those of FIG. 3 are denoted respectively by the same reference symbols.

The DVD player 2 of the AV system 1 to which the second embodiment is applicable controls all the operations thereof by means of the DVD controller 21 including a CPU. The DVD controller 21 reads the DVD video data DV1 and the DVD audio data DA1 of the contents recorded on the DVD 22 by means of an optical pickup 23 and sends them out to a backend section 24.

The backend section 24 executes predetermined processes including a decoding process and an error correction process on the DVD video data DV1 and the DVD audio data DA1 and sends out the DVD video data DV1 and the DVD audio data DA1 to audio format conversion section 25.

The DVD controller 21 of the DVD player 2 is adapted to read the reception capacity of the AV amp 4 written in the EEPROM 38 of the AV amp 4 by way of the HDMI cable 5 and recognizes the limit of the audio reception capacity of the AV amp 4.

Then, the DVD controller 21 of the DVD player 2 converts the format of the DVD audio data DA1 into a format good for the reception capacity of the AV amp 4 and transmits the DVD audio data DA2 obtained as a result from the HDMI transmission section 26 to the AV amp 4 by way of the input/output interface 27, the HDMI cable 5 and the input/output interface 32.

The HDMI transmission section 26 converts the format of the DVD video data DV2 and that of the DVD audio data DA2 into those in which it can transmit the data by way of the HDMI cable 5 and then transmits them to the AV amp 4 by way of input/output terminals 27, 32 and the HDMI cable 5 that conform to the HDMI Standard.

The AV amp 4 controls all the operations thereof by means of the amp controller 31 including a CPU and the amp controller 31 executes an audio transmission process, following an audio transmission sequence (FIG. 8), which will be described in greater detail hereinafter, by starting driving a Random Access Memory (RAM) and executing application programs including a basic program and an audio transmission process program stored in an internal Read Only Memory (ROM), a hard disk or the like.

In reality, the AV amp 4 transmits the DVD video data DV2 and the DVD audio data DA2 it receives as input by way of the input/output terminal 32 to the HDMI reception section 33.

The HDMI reception section 33 turns the format of the DVD video data DV2 and that of the DVD audio data DA2 back into those by which it can process the data by means of the DSP 34 and so on and sends out the DVD video data DV3 and the DVD audio data DA3 obtained as a result respectively to the HDMI transmission section 37 and to the DSP 34.

The DSP 34 executes digital signal processes including a digital/analog conversion process on the DVD audio data DA3 and boosts the obtained DVD audio signal SA4 to a predetermined level by means of an amplifier 35. Subsequently, the DSP 34 outputs the sounds of the DVD audio signal SA4 from the speakers 7 through 11.

The HDMI transmission section 37 converts the format of the DVD audio data DA3 and that of the DVD video data DV3 into those that can be used for transmission byway of the HDMI cable 6 and subsequently transmits them the data to the TV 3 by way of the input/output terminals 40, 42 and the HDMI cable 6 that conform to the HDMI Standard.

As the through mode is selected by the user, the amp controller 31 of the AV amp 4 reads the reception capacity (in this instance, only for PCM-2ch) of the TV 3 written in the EEPROM 46 of the TV 3 by way of the I2C bus of the HDMI cable 6 and recognizes it.

Then, the amp controller 31 of the AV amp 4 compares the reception capacity (for Dolby AC3-5.1ch, DTS, PCM-6ch and PCM-2ch) written in its own EEPROM 38 and the reception capacity (for PCM-2ch) of the TV 3 and understands that the common reception capacity (to be referred to as common capacity hereinafter) is only for "PCM-2ch". Then, it rewrites the EEPROM 38 so as to make it store only the common capacity (for PCM-2ch).

The TV 3 controls all the operation thereof by means of the TV controller 41, which includes a CPU, and transmits the DVD video data DV3 and the DVD audio data DA3 it receives by way of the input/output terminal 42 to the HDMI reception section 43.

The HDMI reception section 43 turns the format of the DVD video data DV3 and that of the DVD audio data DA3 back into those by which it can process the data by means of the video DSP 47 and the audio DSP 44 and so on and sends out the DVD video data DV4 and the DVD audio data DA4 obtained as a result respectively to the video DSP 47 and to the audio DSP 44.

The video DSP 47 executes digital signal processes including a digital/analog transformation process on the DVD video data DV4 and outputs the DVD video signal SV5 obtained as a result to the monitor section 3A so as to let the monitor section 3A display the images that corresponds to the DVD video signal SV5.

The audio DSP 44 executes digital signal processes including a digital/analog transformation process on the DVD audio data DA3, amplifies the DVD audio signal TA5 obtained as a result to a predetermined level by an amplifier 45 and then outputs the sounds that correspond to the DVD audio signal TA5 by way of the speakers 12 and 13.

With the above-described arrangement, the images that correspond to the DVD video data DV1 reproduced by the DVD player 2 are displayed on the monitor 3A while the sounds that correspond to the DVD audio data DA1 also reproduced by the DVD player 2 are output in the audio format that matches the reception capacity of the TV 3.

(3-5) Sequence of Audio Transmission Process to TV by Means of Software

Figure 8:
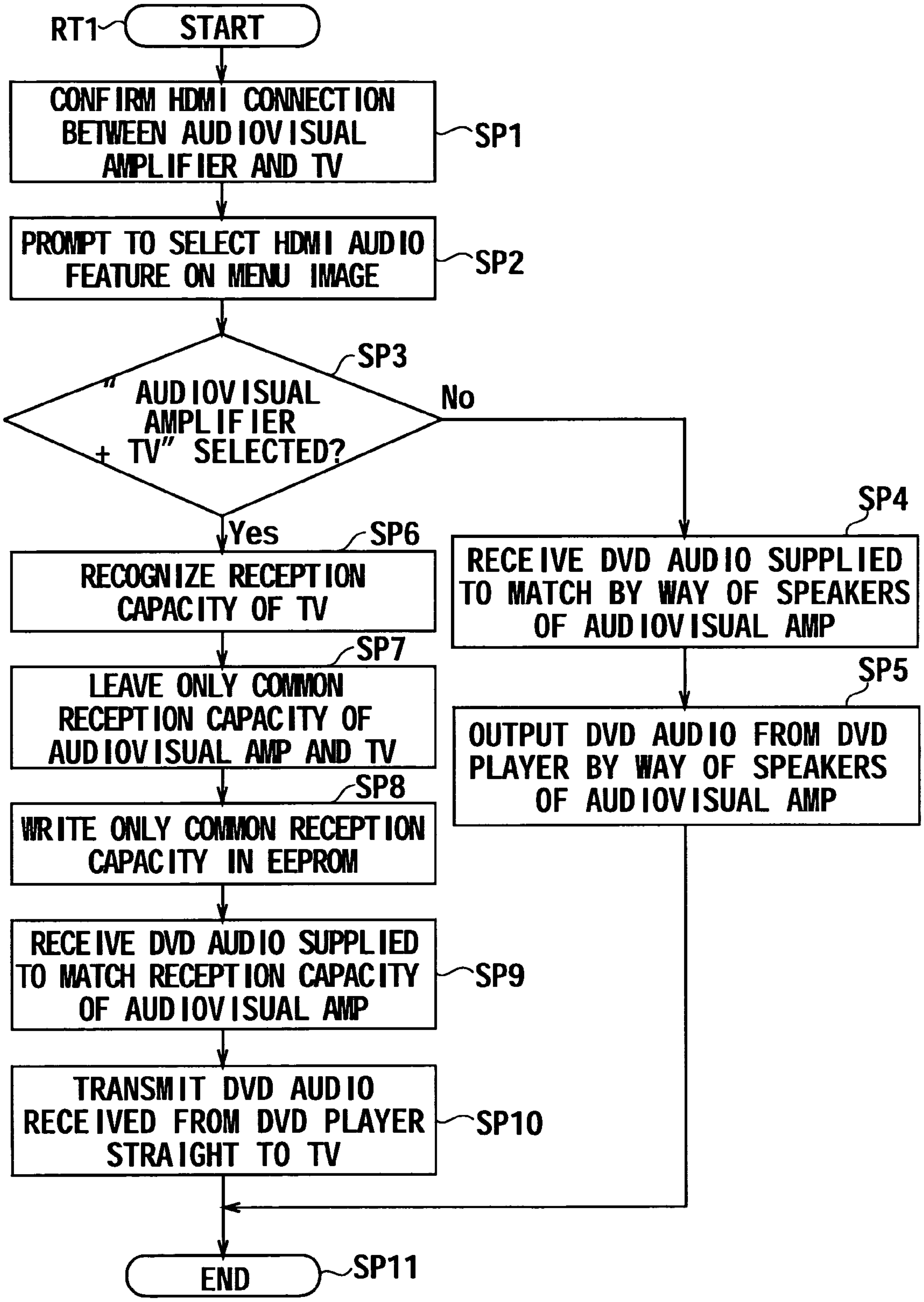
FIG. 8 is a flowchart showing the sequence of the audio transmission process to a TV by means of software.

Now, the sequence of the audio transmission process to be executed by the AV amp 4 of the second embodiment of the AV system 1 by means of software will be described below by referring to the flow chart of FIG. 8.

The amp controller 31 of the AV amp 4 starts routine RT1 and moves to Step SP1, where it confirms that the AV amp 4 and the TV 3 are connected to each other by way of the HDMI cable 6. Then, the amp controller 31 moves to the next step, or Step SP2.

In Step SP2, the amp controller 31 sees that the item of "HDMI audio feature" is selected from the main menu (not shown) that is being displayed on the display section 4A and then moves to the next step, or Step SP3.

In Step SP3, the amp controller 31 determines if the item of "AV amplifier+TV" is selected or not from the sub-menu (not shown) that is displayed on the display section 4A after the selection of "HDMI audio feature".

If the answer to the question is negative, it means that the item of "AV amp+TV" is not selected and hence not the through mode but the interrupt mode is selected by the user. Then, the amp controller 31 moves to the next step, or Step SP4.

In Step SP4, the amp controller 31 receives the DVD audio data DA2 for Dolby AC3-5.1ch supplied from the DVD player 2 that match the reception capacity (Dolby AC3-5.1ch, DTS, PCM-6ch and PCM-2ch) of the AV amp and then moves to the next step, or Step SP5.

In Step SP5, the amp controller 31 outputs the sounds that correspond to the DVD audio data DA2 of Dolby AC3-5.1ch as supplied from the DVD player 2 by way of the plurality of speakers 7 through 11 to realize 5.1ch surround and then moves to the next step, or Step S11, where it ends the process.

If, on the other hand, the answer to the question is affirmative, it means that not the interrupt mode but the through mode is selected. Then, the amp controller 31 moves to Step SP6.

In Step SP6, the amp controller 31 reads and recognizes the reception capacity (PCM-2ch) of the TV 3 that is written in the EEPROM 46 of the TV 3 and then moves to the next step, or Step SP7.

In Step SP7, the amp controller 31 compares the reception capacity (DolbyAC3-5.1ch, DTS, PCM-6ch and PCM-2ch) written in its own EEPROM 38 and the reception capacity (PCM-2ch) of the TV 3 and leaves only the common capacity of "PCM-2ch" in the EEPROM 38, before it moves to the next step, or Step SP8.

In Step SP8, the amp controller 31 rewrites the contents of the EEPROM 38 by storing only the common capacity of "PCM-2ch" and erasing the remaining part of its proper capacity and then moves to the next step, or Step SP9.

In Step SP9, the amp controller 31 receives the DVD audio data DA2 of PCM-2ch supplied from the DVD player 2, which match the rewritten reception capacity (PCM-2ch) in the EEPROM 38 of the AV amp 4, and then moves to the next step, or Step SP10.

In Step SP10, the amp controller 31 transmits the DVD audio data DA2 for PCM-2ch it receives from the DVD player 2 straight to the TV 3 by way of the HDMI cable 6. In other words, the amp controller 31 simply relays the DVD audio data DA2 for PCM-2ch supplied from the DVD player 2 to the TV 3 and moves to the next step, or Step SP11, where it ends the process.

(3-6) Operations and Advantages of the Second Embodiment

The DVD player 2, the AV amp 4 and the TV 3 of the AV system 1 realized by applying the second embodiment may be defined respectively as source machine, a repeater and a sink machine as in the case of the first embodiment In the AV system 2 realized by applying the second embodiment, the AV amp 4 is adapted to prompt the user to select either the interrupt mode or the through mode for operation. Thus, the user is provided with a degree of freedom by which he or she can select either the speaker output (5.1ch surround) that uses the speakers 7 through 11 of the AV amp 4 or the speaker output (stereo) that uses the speakers 12 and 13 of the television receiving set, or TV 3.

Thus, when the interrupt mode is selected, which is the mode in which the DVD audio data DA1 supplied from the DVD player 2 are not transmitted from the AV amp 4 to the TV 3, the AV amp 4 can output the sounds that correspond to the DVD audio data DA1 it receives from the DVD with the highest sound quality (Dolby AC3-5.1ch) within the limit of its reception capacity by way of the speakers 7 through 11 of the AV amp 4.

When, on the other hand, the through mode is selected, which is the mode in which the DVD audio data DA2 for PCM-2ch supplied from the DVD player 2 are transmitted straight to the TV 3 without any format conversion, the AV amp 4 makes its own reception capacity agree with the reception capacity of the TV 3 that is the final destination of the DVD audio data DA2. Then, it receives the DVD audio data DA2 for PCM-2ch that match the reception capacity of the TV 3 and transmits them straight to the TV 3.

Since the AV amp 4 can output the sounds that correspond to the DVD audio data DA2 supplied from the DVD player 2 by way of its own speakers 7 through 11, it is consequently possible to output the sounds that correspond to the DVD audio data DA1 both by way of the speakers 7 through 11 of the AV amp 4 and by way of the speakers 12, 13 of the TV 3.

Therefore, the AV amp 4 can transmit the DVD audio data DA2 supplied from the DVD player 2 straight to the TV 3 so that it can add the speaker output of the TV 3 to the speaker output of the AV amp 4 when the through mode is selected, whereas the AV amp 4 can only transmit the DVD audio data DA2 straight to the TV 3 when the interrupt mode is selected.

Particularly, the AV system 1 can provide sounds for Dolby AC3-5.1ch by way of the plurality of speakers 7 through 11 of the AV amp 4 when the interrupt mode is selected and additionally it can transmit the DVD audio data DA2 from the DVD player 2 that match the reception capacity of the TV 3 straight to the TV 3 by way of the AV amp 4 when the through mode is selected. Thus, the user can have an enhanced choice of speaker output.

As a matter of course, with the AV system 1, when the through mode is selected, it is possible to suspend the emission of stereo sounds by means of the speakers 12 and 13 of the TV3 when the AV amp 4 is outputting stereo sounds of 5.1ch surround by means of the plurality of speakers 7 through 11 or suspend the emission of stereo sounds by means of the speakers 7 through 11 of the AV amp 4 when the TV 3 is outputting stereo sounds by means of the speakers 12 and 13 of the TV3.

With the above-described arrangement, the AV amp 4 of the second embodiment is adapted to rewrite the contents of the EEPROM 38 by means of software to accommodate the difference between the audio format of the DVD player 2 and that of the TV 3. Thus, unlike the first embodiment, the second embodiment does not require any additional hardware such as the audio format conversion section 36 and the video delay memory 39 and hence can simplify its configuration.

Thus, an AV system 1 realized by applying the second embodiment can operate in two modes, the interrupt mode and the through mode, and it can output high quality sounds that correspond to the DVD audio data DA2 for Dolby AC3-5.1ch as supplied from the DVD player 2 by way of the speakers 7 through 11 of the AV amp 4 when the interrupt mode is selected, whereas it can output stereo sounds that correspond to the DVD audio data DA2 for PCM-2ch as supplied from the DVD player 2 by way of the speakers 12 and 13 of the TV 3 when the through mode is selected. Thus, the user is provided with an enhanced degree of freedom in terms of speaker output and a highly convenient listening environment.

(4) Other Embodiments

While the DVD player 2 and the AV amp 4 are connected to each other by way of an HDMI cable 5 and the AV amp 4 and the TV 3 are connected to each other by way of an HDMI cable 6 in the above-described first and second embodiments, the present invention is by no means limited thereto. More specifically, the DVD player 2 and the AV amp 4 and the AV amp 4 and the TV 3 may be connected by means of IEEE 1394 cables that conform to the Institute of Electrical and Electronics Engineers (IEEE) 1394 Standards, USB cables that conform to the Universal Serial Bus (USB) Standards, SDI cables that conform to the Serial Digital Bus (SDB) Standards or some other cables. Alternatively they may be connected by way of wireless communication channels such as Bluetooth or wireless communication channels conforming to the IEEE 802.11g Standard.

While the sequence of the audio transmission process (FIG. 8) is followed as the programs for the audio transmission process that are stored in the internal ROM of the AV amp 4 are started on the RAM in the above-described second embodiment, the present invention is by no means limited thereto and it may alternatively be so arranged that the sequence of the audio transmission process is followed as a program storage medium that stores the programs for the audio transmission process is installed in the AV amp 4.

Examples of program storage mediums that can be used to install audio transmission programs in the AV amp 4 for the purpose of the present invention include not only package mediums such as flexible disks, Compact Disc-Read Only Memories (CD-ROMs), Digital Versatile Discs (DVDs), semiconductor memories, removable hard disks but also magnetic disks for temporarily or permanently storing audio transmission programs. Examples of measures for storing such audio transmission programs in a program storage medium include wired or wireless communication mediums such as local area networks and digital satellite broadcasting systems. Such audio transmission programs may be stored by way of any of various communication interfaces such as routers and modems.

While a DVD player 2 is used as upstream audio output apparatus in each of the above described AV systems 1 to which the first and second embodiments of the present invention are respectively applicable, the present invention is by no means limited thereto and any of various appliances adapted to output sounds may alternatively be used as the upstream audio output apparatus. Examples of appliances that can be used for the upstream appliance include sound reproduction apparatus for reproducing sounds from disk-shaped recording mediums such as Super Audio CD (SACD) players, DVD audio players, DVD recorders, Compact Disc (CD) players and hard disk players and sound reproduction apparatuses for reproducing sounds from tape-shaped recording mediums such as personal computers, navigation apparatuses and mobile phones.

While a TV 3 is used as downstream audio output apparatus in each of the above described AV systems 1 to which the first and second embodiments of the present invention are respectively applicable, the present invention is by no means limited thereto and any of various appliances adapted to output sounds may alternatively be used as downstream audio output appliance. Examples of appliances that can be used for the downstream appliance include mini component stereo players (to be referred to as mini compos hereinafter), personal computers, navigation apparatus and mobile phones.

Figure 9:
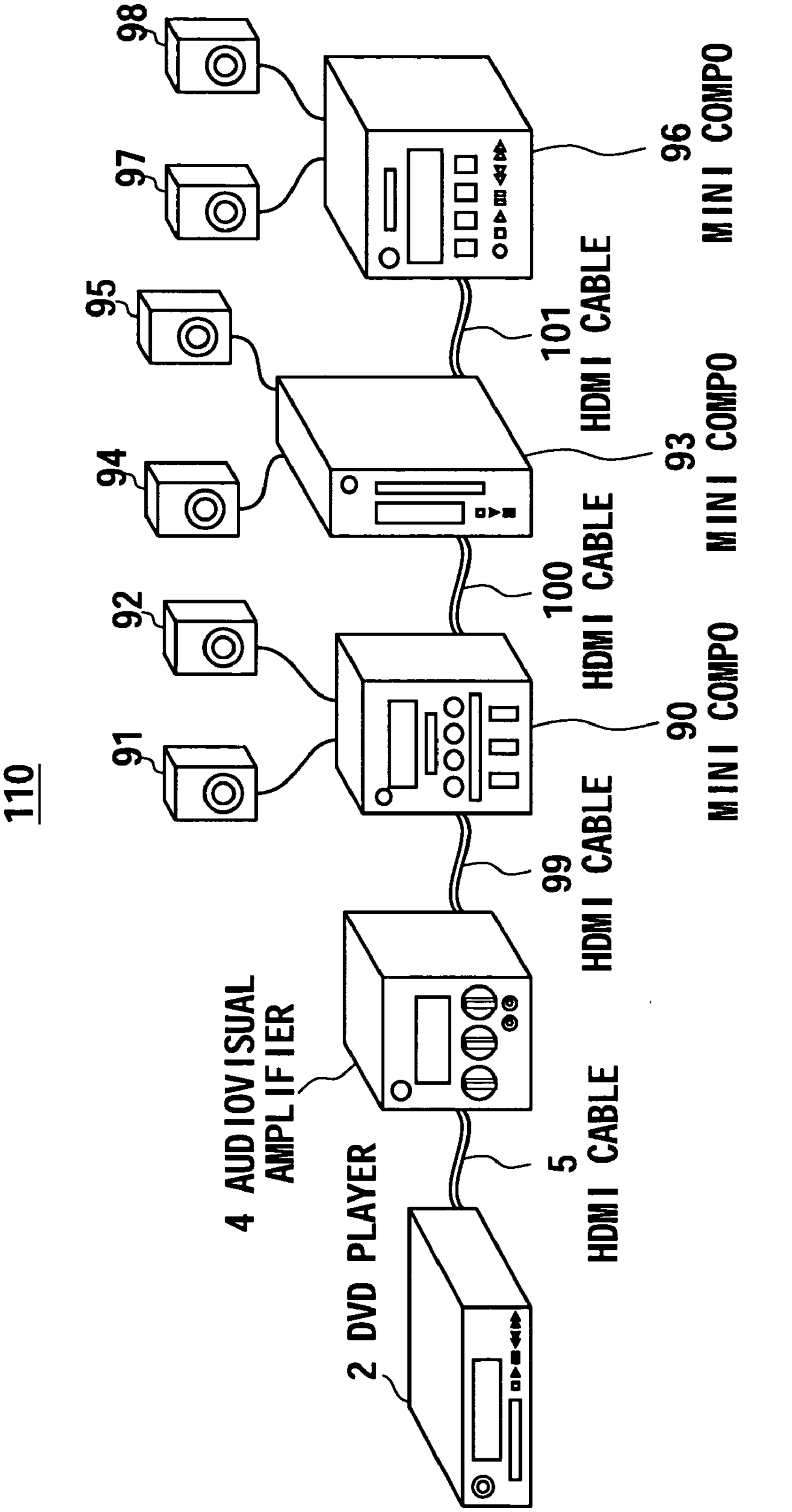
FIG. 9 is a schematic block diagram of another embodiment of the present invention and a schematic illustration of the circuit configuration of the AV system to which the embodiment is applied.

For example, in the AV system 110 illustrated in FIG. 9, a DVD player 2 and an AV amp 4 are connected to each other by way of an HDMI cable 5 and additionally, mini compos 90, 93 and 96 are connected in series to the AV amp 4 by way of HDMI cables 99, 100 and 101.

Note that, in FIG. 9, speakers 91 and 92 are connected to the mini compo 90 and speakers 94 and 95 are connected to the mini compo 93, while speakers 97 and 98 are connected to the mini compo 96.

With this arrangement, the AV amp 4 reads and recognizes the reception capacity of each of the downstream mini compos 90, 93 and 96 and rewrites its own EEPROM 38 to store the common reception capacity that is common to all the mini compos 90, 93 and 96. Thus, the AV amp 4 sequentially and straightly transmits the DVD audio data DA2 that are supplied from the DVD player 2 and match the common reception capacity of the mini compos 90, 93 and 96, to the mini compos 90, 93 and 96.

Therefore, the AV system 110 can provide the sounds that correspond to the DVD audio data DA1 from the DVD player 2, ie., one source machine, to the mini compos 90, 93 and 96 in different rooms, even if the mini compos 90, 93 and 96 are installed in the different rooms While EEPROMs 38 and 46 are used as rewritable storage mediums for storing a reception capacity in each of the above-described first and second embodiments, the present invention is by no means limited thereto and external storage mediums that can be removably fitted to the AV amplifier 4 may alternatively be used for the purpose of the present invention. Examples of such external storage mediums include semiconductor memories, ReWritables (DVD-RWs), Magneto-Opticals (MOs).

While the AV amp 4 of each of the above-described first and second embodiments has reception capacity for Dolby AC3-5.1ch, DTS, PCM-6ch and PCM-2ch, the present invention is by no means limited thereto and the reception capacity of the AV amp 4 and that of the TV3 may be designed to be compatible with many other audio formats or only with some of them.

While the AV amp 4 that operates as audio relay apparatus of the first embodiment includes an HDMI reception section 33 that operates as reception section, an amp controller 31 that operates as reception capacity recognizing section, an audio format conversion section 36 that operates as conversion section and an HDMI transmission section 37 that operates as transmission section, the present invention is by no means limited thereto and the reception section, the reception capacity recognizing section, the conversion section and the transmission section may have respective circuit configurations that are different from those of the above-listed sections to realize an AV amp 4 as the first embodiment of audio relay apparatus according to the present invention.

While the AV amp 4 that operates as audio relay apparatus of the second embodiment includes an HDMI reception section 33 that operates as reception section, an amp controller 31 that operates as reception capacity recognizing section, an EEPROM 38 that operates as relay side storage section, an amp controller 31 that operates as control section and an HDMI transmission section 37 that operates as transmission section, the present invention is by no means limited thereto and the reception section, the reception capacity recognizing section, the relay side storage section, the control section and the transmission section may have respective circuit configurations that are different from those of the above-listed sections to realize an AV amp 4 as the second embodiment of audio relay apparatus according to the present invention.

Thus, an audio relay apparatus and an audio relay method according to the invention can find applications when relaying audio signals from an upstream audio output apparatus to a downstream audio output apparatus if the audio format of the upstream audio output apparatus and that of the downstream audio output apparatus differ from each other.

It should be understood by those skilled in the art that various modifications, combinations, sub-combinations and alterations may occur depending on design requirements and other factors insofar as they are within the scope of the appended claims or the equivalents thereof.

What is claimed is:

1. An audio relay apparatus for receiving audio signals from an upstream audio output apparatus and relaying and outputting the audio signals to a downstream audio output apparatus, the audio relay apparatus comprising:

- a first interface connectable with the upstream audio output apparatus;
- a relay apparatus memory configured to provide information regarding an audio signal reception capacity of the audio relay apparatus to the upstream apparatus;
- a second interface connectable with the downstream audio output apparatus, the first and second interfaces being of the same type;
- a reception section for receiving audio signals from the upstream audio output apparatus via the first interface, a format of the received audio signals determined based on the information regarding the audio signal reception capacity of the audio relay apparatus;
- a reception capacity recognizing section for reading and recognizing an audio signal reception capacity of the downstream audio output apparatus from a memory section of the downstream audio output apparatus;
- a conversion section for converting, based on the read audio signal reception capacity of the downstream audio output apparatus, the received audio signals from the determined format into a format that matches with the audio signal reception capacity of the downstream audio output apparatus; and
- a transmission section for transmitting the converted audio signals to the downstream audio output apparatus via the second interface.

2. The apparatus according to claim 1, wherein the audio relay apparatus is an audiovisual apparatus.

3. An audio relay method for receiving audio signals from an upstream audio output apparatus and relaying and outputting the audio signals to a downstream audio output apparatus by an audio relay apparatus, the method comprising:

- transmitting an audio signal reception capacity to the upstream apparatus;
- receiving audio signals from the upstream audio output apparatus through a first interface of the audio relay apparatus based on the audio signal reception capacity of the audio relay apparatus;

reading and recognizing an audio signal reception capacity of the downstream audio output apparatus from a memory section of the downstream audio output apparatus;

converting, based on the read audio signal reception capacity of the downstream audio output apparatus, the received audio signals from the determined format into a format that matches with the audio signal reception capacity of the downstream audio output apparatus; and transmitting the converted audio signals to the downstream audio output apparatus through a second interface of the audio relay apparatus, the first and second interfaces being of the same type.

4. An audio relay apparatus for receiving audio signals from an upstream audio output apparatus and relaying and outputting the audio signals to a downstream audio output apparatus, the audio relay apparatus comprising:

a memory section of the audio relay apparatus configured to provide information to the upstream apparatus regarding an audio signal reception capacity stored in the memory section;

a second interface connectable with the downstream audio output apparatus, the first and second interfaces being of the same type;

a reception section for receiving audio signals from the upstream audio output apparatus based on the audio signal reception capacity information;

a reception capacity recognizing section for reading and recognizing an audio signal reception capacity of the downstream audio output apparatus from a memory section of the downstream audio output apparatus;

a relay side storage section for storing the audio signal reception capacity of the audio relay apparatus;

a control section for rewriting the contents stored in the memory section of the audio relay apparatus so as to store a common capacity of the audio signal reception capacity of the audio relay apparatus and the audio signal reception capacity of the downstream audio output apparatus so that the audio relay apparatus will receive the audio signals from the upstream apparatus in a format of the common capacity; and a transmission section for transmitting the audio signals received from the upstream audio output apparatus straight to the downstream audio output apparatus so as to correspond to the common capacity.

5. The apparatus according to claim 4, wherein the control section is adapted to operate either in a through mode of transmitting the audio signals received from the upstream audio output apparatus by way of the reception section straight to the downstream audio output apparatus or in an interrupt mode of not transmitting the audio signals received from the upstream audio output apparatus to the downstream audio output apparatus.

6. The apparatus according to claim 4, wherein, when the interrupt mode is selected, the control section outputs the sounds corresponding to the audio signals received from the upstream audio output apparatus by means of an audio output means connected to the audio relay apparatus so as to correspond to the audio signal reception capacity of the audio relay apparatus itself stored in the relay side storage section without rewriting the contents of the relay side storage section.

7. An audio relay method for receiving audio signals from an upstream audio output apparatus and relaying and outputting the audio signals to a downstream audio output apparatus by an audio relay apparatus, the method comprising:

transmitting an audio signal reception capacity stored in a relay side storage section to the upstream apparatus;

receiving audio signals from the upstream audio output apparatus through a first interface of the audio relay apparatus based on the audio signal reception capacity;

reading and recognizing the audio signal reception capacity of the downstream audio output apparatus from a memory section of the downstream audio output apparatus;

rewriting, by the audio relay apparatus, contents stored in the relay side storage section so as to store a common capacity of an audio signal reception capacity of the audio relay apparatus and the audio signal reception capacity of the downstream audio output apparatus so that the audio relay apparatus will receive the audio signals from the upstream apparatus in a format of the common capacity; and transmitting the audio signals received from the upstream audio output apparatus through the first interface straight to the downstream audio output apparatus through a second interface of the audio relay apparatus, the first and second interfaces being of the same type, so as to correspond to the common capacity.

* * * * *